United States Patent [19]

Rector, Jr.

[11] 4,336,982
[45] Jun. 29, 1982

[54] MGF$_2$ COATING FOR PROMOTING ADHERENCE OF THIN FILMS TO SINGLE CRYSTAL MATERIALS

[75] Inventor: Malcolm B. Rector, Jr., Arcadia, Calif.

[73] Assignee: Xerox Corporation, Stamford, Conn.

[21] Appl. No.: 174,972

[22] Filed: Aug. 4, 1980

[51] Int. Cl.$^3$ .............................................. G02F 1/11
[52] U.S. Cl. ..................................... 350/358; 350/356
[58] Field of Search ................. 350/358, 353, 354–356

[56] References Cited

U.S. PATENT DOCUMENTS 2,754,238  7/1956  Arenberg .......................... 350/358
3,562,414  2/1971  Blum ................................. 350/358
3,617,931  11/1971  Pinnow et al. ..................... 350/358
4,299,449  11/1981  Ohta .................................. 350/358

OTHER PUBLICATIONS

Zydzik et al., Strong Adhesion of Vacuum-Evaporated Gold to Oxide or Glass Substrates, Appl. Phys. Let. vol. 31, No. 10, (Nov. 1977), pp. 697–699.

*Primary Examiner*—William L. Sikes
*Attorney, Agent, or Firm*—Franklyn C. Weiss

[57] ABSTRACT

A thin layer of MgF$_2$ is deposited on cleaned surfaces of a single crystal material substrate to promote the adhesion of both a transducer and antireflection coating overlying the MgF$_2$ layer to the underlying substrate.

6 Claims, 1 Drawing Figure

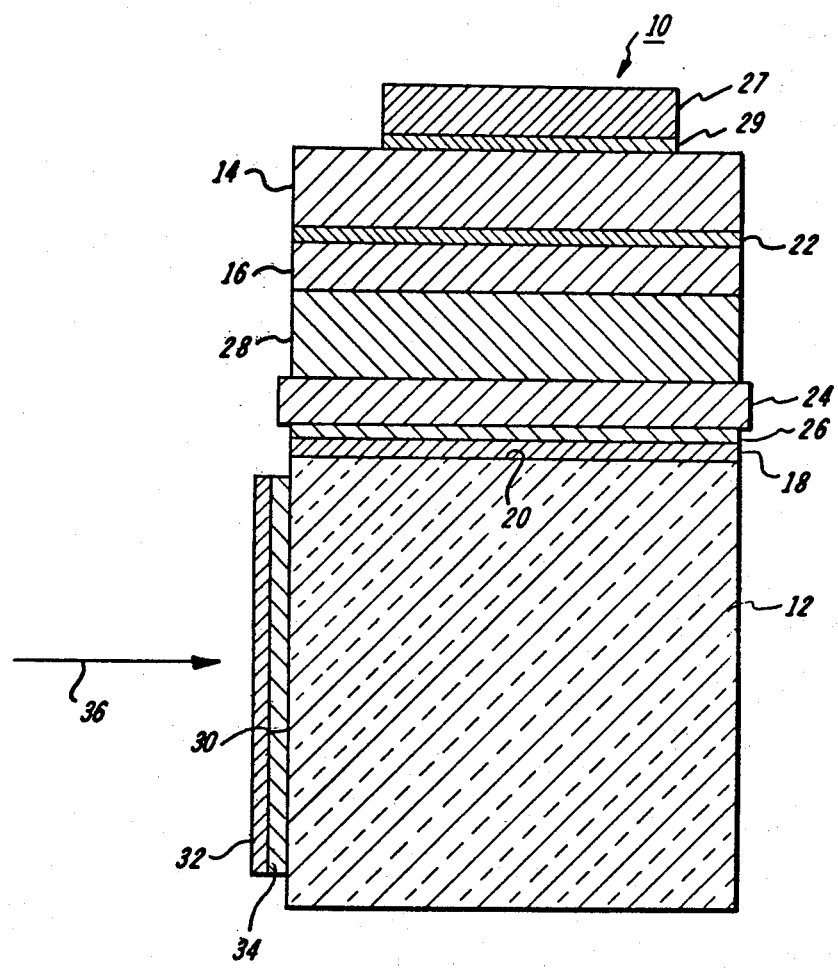

MGF₂ COATING FOR PROMOTING ADHERENCE OF THIN FILMS TO SINGLE CRYSTAL MATERIALS

BACKGROUND OF THE INVENTION

1. Field of the Invention

The present invention relates to single crystal material modulators/deflectors which utilize a MgF$_2$ layer to promote both the adherence of a piezoelectric transducer and antireflection coatings to the material.

2. Description of the Prior Art

A typical prior art single crystal material modulator/deflector comprises a lithium niobate transducer bonded to one surface of the underlying material through an intermediate thin film layer, such as indium. The crystal material is, on the surface exposed to the incident light beam, provided with an antireflection coating, such as thorium fluoride. This prior art configuration is described in U.S. Pat. No. 3,617,931. An article by G. J. Zydzik et al., *Applied Physics Letters*, Vol. 31, No. 10, Nov. 15, 1977, describes the use of fluoride thin films to bond vacuum-evaporated gold onto oxide or glass substrates.

Experiments have indicated that when vacuum deposited SiO$_2$ is utilized as the anti-reflection coating or chrome is used as the intermediate bonding layer, these materials would not repeatably adhere to the underlying single crystal material (such as TeO$_2$) and could be easily removed. SiO$_2$ is difficult to apply to the single crystal material due to temperature coefficient differentials between SiO$_2$ and the crystal material.

What would be desirable therefore is to provide an improved bonding technique which would substantially enhance the bonding capability of a piezoelectric transducer to a single crystal structure and which substantially enhances the adhesion of anti-reflection coatings to the single crystal structure in a manner such that the coatings are durable and can be cleaned without substantial peeling or scratching.

SUMMARY OF THE PRESENT INVENTION

The present invention provides an improved technique for fabricating single crystal acousto-optic (and electro-optic) modulators/deflectors and, in particular, utilizes an intermediate thin layer of MgF$_2$ to promote the adhesion of a piezoelectric transducer, in the case of an acousto-optic modulator/deflector, to one surface of the single crystal, a thin layer of MgF$_2$ also being utilized to promote the adherence of an anti-reflection coating to another surface of the crystal.

It is an object of the present invention to provide an improved technique for fabricating single crystal modulators and deflectors.

It is a further object of the present invention to provide an improved technique for fabricating single crystal acousto-optic modulators or deflectors wherein a thin layer of MgF$_2$ is utilized to promote the adhesion of a piezoelectric transducer to one surface of the single crystal and wherein a thin layer of MgF$_2$ may also be utilized to promote the adherence of an anti-reflection coating to another surface of the crystal.

It is still a further object of the present invention to provide improved single crystal acousto-optic modulators/deflectors which comprise a thin layer of MgF$_2$ interposed between a piezoelectric transducer and one surface of the crystal and a thin layer of MgF$_2$ interposed between an anti-reflection layer and another surface of the crystal.

DESCRIPTION OF THE DRAWING

For a better understanding of the invention as well as other objects and further features thereof, reference is made to the following description which is to be read in conjunction with the sole FIGURE which illustrates the design of a light modulator/deflector in accordance with the teachings of the present invention.

DESCRIPTION OF THE PREFERRED EMBODIMENT

The sole FIGURE depicts a device 10 which may be utilized as either a modulator or deflector dependent on user requirements. Although the present invention is primarily described hereinafter with reference to acousto-optic modulators/deflectors, the principles set forth are applicable to the fabrication of electro-optic modulators/deflectors.

Device 10 consists of a single crystal 12 which, in the preferred mode, is TeO$_2$ (LiTaO$_3$ or LiNiO$_3$ for electro-optic devices) and in which an elastic wave field is produced by electrically driving a lithium niobate transducer 14. Transducer 14 is provided with a conductive gold layer 16, which may function as one device electrode which is connected to an electric source (not shown). Bonding of transducer 14 to the underlying crystal 12 is accomplished with an adhesive coating through a layer 18 of magnesium fluoride (MgF$_2$), the MgF$_2$ layer 18 being vacuum-evaporated on surface 20 of crystal 12. A layer 22 of chromium is provided to promote the adhesion of the gold layer 16 to transducer 14. An extended second conductive layer 24, which in the preferred mode is utilized as the device electrode, is deposited on a second layer of chromium 26, the chromium layer 26 promoting the adhesion of layer 24 to the underlying layer 18 of MgF$_2$. A layer 28 of indium is provided between gold layers 16 and 24, the indium layer providing the coupling bond between transducer 14 and crystal 12 during the fabrication of device 10. A gold electrode layer 27 is coupled to transducer 14 via an adhesion promoting chromium layer 29.

Crystal element 12 is provided, on surface 30, with silicon dioxide (SiO$_2$) antireflection coating 32, a sublayer 34 of MgF$_2$ being interposed between surface 30 and layer 32, layer 32 defining the propagation direction for an incident light beam 36, as for example, a 6128 Å wavelength beam generated by a helium-neon laser (a second optical face, comprising a layer of SiO$_2$ and MgF$_2$ is formed as surface 31 and is not shown.)

The thickness of the layers are selected to optimize the acoustic coupling into substrate 12. Typical thickness ranges are as follows:
16—1000 Å to about 3000 Å
18—175 Å to about 225 Å
22—100 Å to about 250 Å
24—1000 Å to about 3000 Å
26—100 Å to about 250 Å
27—100 Å to about 250 Å
28—1000 Å to about 5000 Å
29—1000 Å to about 3000 Å
32—800 Å to about 1000 Å
34—175 Å to about 225 Å

In the case of electro-optic devices made using MgF$_2$ as an adhesion promoting material, a plurality of gold electrodes are separated from one surface of the underlying single crystal (LiTaO$_3$ or LiNiO$_3$) by alternate layers of chromium, silicon dioxide and MgF$_2$, an antireflection coating of SiO$_2$ being applied to second and third surfaces (optical faces) of the crystal via a layer of MgF$_2$.

The acousto-optic modulator of the present invention is fabricated using standard fabrication procedures. The TeO$_2$ substrate 12 and LiNbO$_3$ transducer 14, separate components, are washed, rinsed and solvent degreased. The TeO$_2$ substrate is then coated, in the preferred mode, with 200 Å of MgF$_2$ on three surfaces, SiO$_2$ is then coated on the two optical faces (over MgF$_2$) using standard E beam optical coating techniques. The substrate 12 and transducer 14 are then glow discharge cleaned in O$_2$. The components are then vacuum metalized using thermal evaporation techniques in the following sequence: a chrome flash is applied to both parts to promote adhesion, then a conductive layer of gold is applied. The components are then coated with indium (around 2000 Å each) and the parts immediately pressed together with approximately 4000 P.S.I. pressure to cold weld indium. The LiNbO$_3$ transducer 14 is then ground down to its fundamental frequency thickness. The top electrode 27 is then applied and wires attached (not shown) to complete the fabrication of the acousto-optic device.

The use of MgF$_2$ in the manner set forth hereinabove promotes the adhesion between layers 26 and 32 and crystal 12 by providing an expansion match material for the fabrication temperatures utilized thereby providing efficient and long-lasting transducer bonds and durable anti-reflection coatings and, in turn, a high-yield fabrication process for the single crystal device 10.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An acousto-optic device comprising:
   a single crystal material having at least first and second surfaces;
   a transducer element;
   an adhesion promoting layer of magnesium fluoride overlying said first crystal surface;
   a layer of bonding material interposed between said transducer element and said adhesion promoting layer; and
   means for electrically driving said transducer element whereby an elastic wave is produced in said crystal material.

2. The device as defined in claim 1 further including a layer of magnesium fluoride interposed between said second crystal surface and an anti-reflection coating.

3. The device as defined in claim 1 wherein said crystal material comprises tellerium oxide.

4. The device as defined in claim 3 wherein said anti-reflection coating comprises silicon dioxide.

5. The device as defined in claim 1 wherein said driving means comprises a layer of conductive material interposed between said transducer element and said layer of bonding material.

6. An electro-optic device comprising:
   a single crystal material having at least first and second surfaces;
   a plurality of electrode elements;
   an adhesion promoting layer of magnesium fluoride overlying said first crystal surface;
   a layer of silicon dioxide interposed between said layer of MgF$_2$ and said plurality of electrodes;
   a layer of magnesium fluoride interposed between said second crystal surface and an anti-reflection layer; and
   means for electrically driving said electrode elements.

* * * * *